Oct. 30, 1962  E. W. LUSTED  3,061,379
APPARATUS FOR HANDLING OF PULVERULENT SOLID MATERIALS
Filed May 6, 1960  3 Sheets-Sheet 1

INVENTOR
Emile W. Lusted,
BY Diggins + LeBlanc
ATTORNEYS

Oct. 30, 1962   E. W. LUSTED   3,061,379
APPARATUS FOR HANDLING OF PULVERULENT SOLID MATERIALS
Filed May 6, 1960   3 Sheets-Sheet 2

INVENTOR
*Emile W. Lusted,*

BY *Diggins + Le Blanc*

ATTORNEYS

Oct. 30, 1962 E. W. LUSTED 3,061,379
APPARATUS FOR HANDLING OF PULVERULENT SOLID MATERIALS
Filed May 6, 1960 3 Sheets-Sheet 3

INVENTOR
Emile W. Lusted,
BY Diggins + Le Blanc
ATTORNEYS

United States Patent Office 3,061,379
Patented Oct. 30, 1962

3,061,379
APPARATUS FOR HANDLING OF PULVERULENT
SOLID MATERIALS
Emile W. Lusted, Baton Rouge, La., assignor to Delta Tank Mfg. Co., Inc., Baton Rouge, La., a corporation of Louisiana
Filed May 6, 1960, Ser. No. 27,399
14 Claims. (Cl. 302—29)

This invention relates to the handling of pulverulent solid materials and more particularly relates to aerators and systems for fluidizing and discharging such materials.

The pneumatic handling of discrete solids, such as crushed and powdered coal, cement, minerals, grains and other flowable materials, can be economically accomplished by suspending the particulate matter in an upflowing bath of pervious fluid, whereby the suspended and so-called aerated "mass" is caused to flow in a manner simulating a true liquid and is dischargeable by gravity into drawing-off conduits.

It previously has been recognized that a major difficulty in the handling of aerated solids is the tendency of a great many materials (i.e., cement) to compact and bridge over a container, bunker, tank, silo or conveying chute. To provide proper functioning, the levitating medium (i.e., air) has been introduced underneath the body of discrete material as a multiplicity of microscopic rising streams. The desired uniformity of upward flow, evenly distributed over the entire surface of the bottom of the container, is usually effected by forming the bottom of the container with a false bottom of an air permeable material and forcing air under pressure through it from a subjoined plenum chamber or windbox formed by and between the false bottom and the side and bottom walls of the casing or container. Usually, the bottom of the container is formed with an integral or detachable trough section over which the air pervious false bottom is hermetically secured.

In applicant's copending application Serial No. 10,534 filed February 16, 1960, entitled "Apparatus for Handling Pulverulent Solid Materials," applicant disclosed a number of improvements over the aerators of the prior art, these improvements essentially comprising normally limp, relatively flexible, demountable pads or blankets adapted to be readily installed in a suitably designed container of the transport type or other variety. One such embodiment comprises an elongated hollow unit having a gas impervious bottom layer and a top layer longitudinally divided into a central gas pervious portion and a gas impervious portion located on each side of said central portion.

One of the problems involved in the use of aerator units such as that last described relates to the possibility of ballooning of the gas impervious top portions when air under pressure is delivered to the interior of the pad. To overcome this problem, applicant's copending application discloses the use of several expedients, including transverse webs (see FIGURES 1-4 of the copending application), the securing of downturned extensions of the top portion of the pad to the bottom of the pad (FIGURES 15-17), or the use of eye and chain connections (FIGURES 20 and 21). While such expedients are extremely effective in accomplishing the function assigned to them, they tend to increase the cost of manufacture of the aerator pad to a significant degree.

Still another problem presented by the manufacture of pads such as those shown in applicant's copending application results from the need to attach the various portions of material used in the aerator to one another. While the seams formed at the points of attachment are effective in providing a durable, well constructed aerator unit, the presence of such seams is apt to form a barrier to the free flow of pulverulent material onto the aerated surface and to prevent the container in which the aerator unit is used from being completely self-cleaning. Such problems may possibly rise, for example, in the embodiments shown in FIGURES 14, 15 and 17 of applicant's copending application.

Still another problem relating to the use of aerators of the type described involves the occasional failure of the aerator units to be completely self-cleaning at points adjacent their longitudinal ends.

It is accordingly a primary object of the present invention to provide an improved aerator unit of the type described in applicant's copending application above-mentioned.

It is another principal object of the present invention to provide an improved normally limp, relatively flexible, demountable aerator unit which, when installed in a suitably designed container for pulverulent material, will render the container substantially completely self-emptying.

It is still another object of the present invention to provide a normally limp, relatively flexible, demountable aerator unit which may be readily installed in a pulverulent material container and which may be inexpensively manufactured.

These and further objects and advantages of the present invention will become more apparent upon reference to the following specification and appended claims, and drawings wherein:

Figure 1:
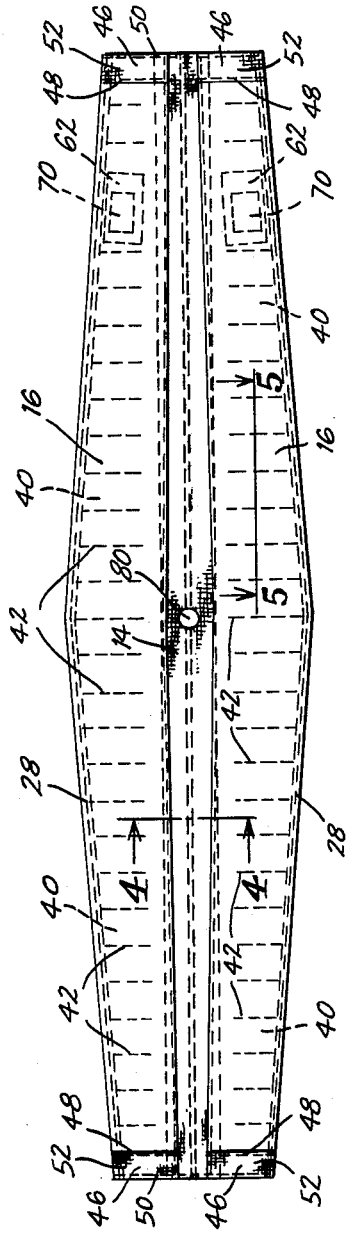
FIGURE 1 is a plan view of the aerator unit of the present invention.

As shown in FIGURES 1-5, the novel aerator unit of the present invention is a normally limp, flexible pad having an upper sheet 10 and a lower sheet 12. Lower sheet 12 is formed of a gas impervious material which, by way of example, may be the diaphragm sheet packing designated as F-601 and manufactured by the B. F. Goodrich Company. The upper sheet of the unit is essentially divided into three sections, a central gas pervious section 14 and a gas impervious side panel 16 on each side of said central section. Side panels 16 may conveniently be fabricated of the same material used for lower sheet 12;

central section 14 is preferably made of a flexible, gas pervious material such as 2-ply cotton belting which has been silicone-treated to impart proper permeability characteristics. The permeability of central section 14 should preferably be 1–10.

Figure 3:
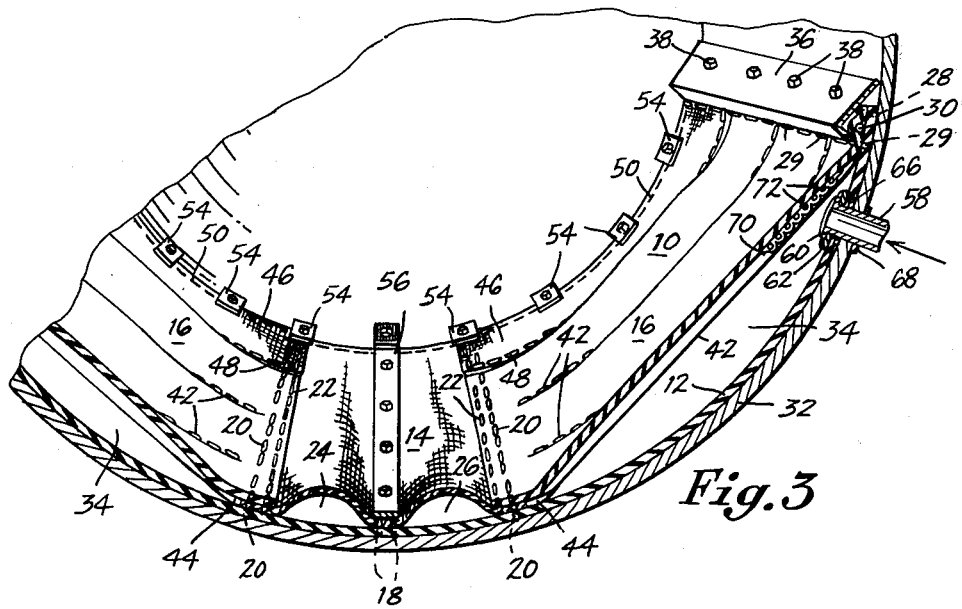
FIGURE 3 is a perspective view through a portion of a transport tank having the aerator unit of FIGURES 1 and 2 mounted therein.
Figure 4:
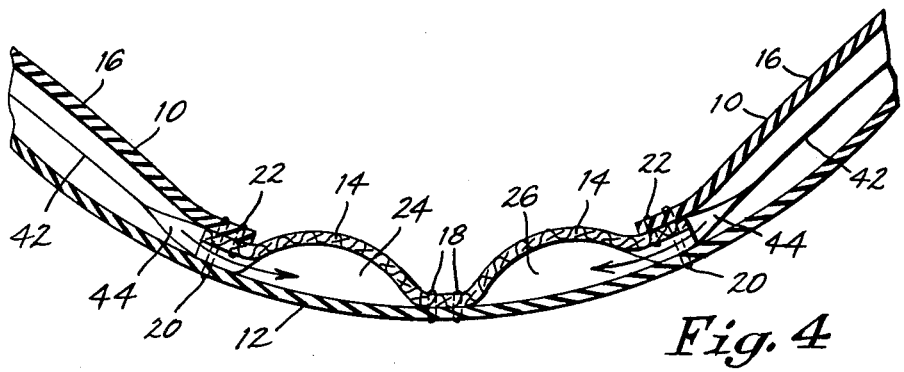
FIGURE 4 is a partial sectional view taken through lines 5—5 in FIGURE 1.

As best shown in FIGURES 3 and 4, gas pervious central section 14 is secured to lower sheet 12 at both its center and edges. It is secured at its center by means of stitching 18 extending continuously along its longitudinal center line; it is secured to lower sheet 12 at each of its longitudinal edges by means of stitching 20 which extends longitudinally from end to end of the aerator unit. For a reason to appear below, however, the latter stitching is discontinuous, a preferred pattern of stitching involving a break of three inches for each twenty-four inches of stitching. The longitudinal edges of central section 14 are also secured to side panels 16 by means of stitching 22 which is longitudinally continuous from end to end of the aerator unit. As is clearly shown in FIGURES 3 and 4, the foregoing stitching pattern establishes two pockets 24 and 26 between gas pervious central section 14 and the portion of lower sheet 12 immediately beneath it.

The outermost longitudinal edges of gas impervious side panels 16 and lower sheet 12 are stitched together at 28 as shown in FIGURE 3. As shown, an elongated section of rope 30 is held in place adjacent each of said outermost edges by means of stitching 28 and a row of stitching 29 to provide a simple means of securing the pad to the tank walls 32 in which the aerator unit is to be positioned. By virtue of stitching 29 and stitching 20, previously described, a pocket 34 is formed on each side of central section 14 between gas impervious side panels 16 and lower sheet 12.

As is clearly illustrated in FIGURE 3, the welted outermost longitudinal edges of the unit may be secured to the tank wall 32 by means of elongated clamps 36 which are in turn held fast to the wall by a plurality of nuts and bolts 38, as is more thoroughly described in applicant's copending application previously mentioned.

Figure 5:
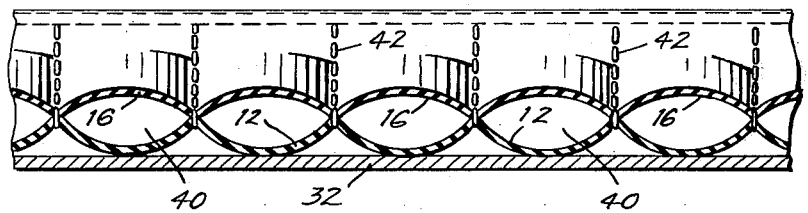

As shown in FIGURES 1, 3 and 5, pockets 34 are longitudinally divided into a plurality of pockets 40 by means of transverse stitching 42 which extends from stitching 29 to within approximately 3 inches of stitching 20. Each row of transverse stitching 42 is preferably spaced from the next adjacent row of stitching 42 by approximately one foot, though other distances may be used depending upon the needs of the system.

As may be seen in FIGURE 5, transverse stitching 42 will establish individual transverse pockets 40 between gas impervious side panels 16 and lower sheet 12. Since the transverse stitching does not extend completely to longitudinal stitching 20, however, transverse pockets 40 will communicate with one another through the passage 44 left open by the break in the stitching. In addition, since longitudinal stitching 20 is discontinuous as above described, passage 44 will communicate with passages 24 and 26, respectively (as shown by the arrows in FIGURE 4), at approximately 24 inch intervals. Thus, air under pressure entering any one of pockets 40 on either side of central section 14 will have ready access to the other pockets 40 and to pockets 24 and 26 beneath gas pervious central section 14.

Gas impervious side panels 16 are not completely longitudinally coextensive with central section 14, the ends of the side panels each terminating short of the respective end of central section 14, as shown in FIGURES 1 and 3. Bridging the gap left by the abbreviation of the ends of side panels 16 are four gas pervious panels 46, which are preferably secured to side panels 16 by stitching 48 before attachment of the side panels to central section 14 and to lower sheet 12. Gas pervious sections 46 are stitched to lower sheet 12 at 50 and 52 to seal the ends of the aerator unit. The pockets formed beneath gas pervious panels 46 and lower sheet 12, however, communicate with the other pockets 40 in the unit in the manner described above for communication of the respective pockets 40 with one another. Gas pervious panels 46 may conveniently be fabricated of the same material used for central section 14.

The ends of the aerator unit may be secured to the end walls of tank 32 by means of brackets 54 in a manner described in applicant's copending application previously mentioned. Similarly, a central bracket 56 may be provided to secure central section 14 to the central bottom portion of the tank 32 as described in said copending application.

Figure 2:
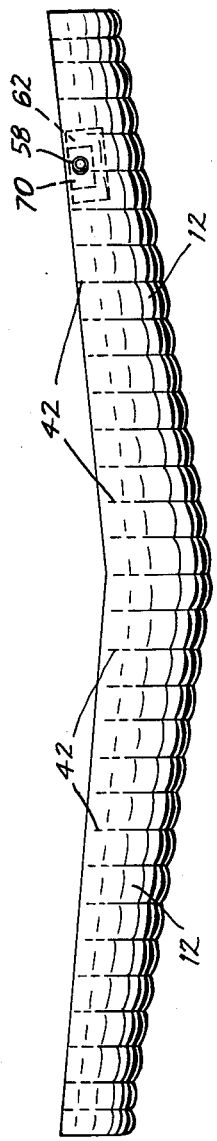
FIGURE 2 is a side elevation of the aerator unit of FIGURE 1.
Figure 7:
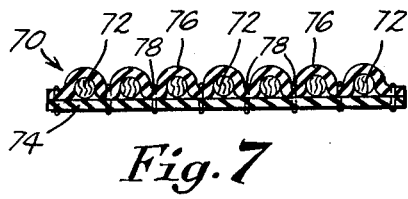
FIGURE 7 is a sectional view taken through lines 7—7 in FIGURE 6.
Figure 8:
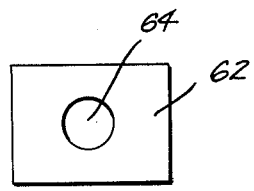
FIGURE 8 is a reenforcing pad usable in connection with the aerator unit of the present invention.
Figure 6:
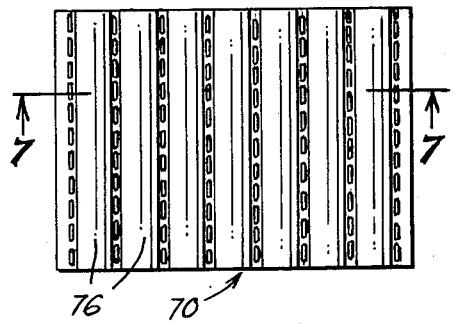
FIGURE 6 is a top plan view of a channelizer pad usable in connection with the aerator units of the present invention.

Lower sheet 12 is suitably provided on each side of central section 14 with an air inlet nipple 58, as is best shown in FIGURES 2 and 3. Nipple 58 is provided with a flange 60 which overlies a reenforcing pad 62 (see FIGURE 8) positioned between the flange and the lower sheet 12. Reenforcing pad 62 is provided with a central aperture 64 and may conveniently be fabricated of the material used for lower sheet 12. A nut 66 threaded on nipple 58 secures the nipple to lower sheet 12. The nipple in turn passes through an aperture provided in tank wall 32 and is secured to said wall by means of a nut 68 threaded onto the nipple. Cemented to the underside of side panels 16 immediately opposite each air inlet 58 is a channelizer pad 70 which is clearly shown in FIGURES 3, 6 and 7. This pad consists of a plurality of rope (or the like) segments 72 positioned in spaced parallel relationship atop a bottom layer 74. Ropes 72 are secured relative to said bottom layer 74 by stitching a top layer 76 to the bottom layer in the manner shown in FIGURES 6 and 7, so as to form a plurality of channels 78. Since channels 78 will be positioned immediately opposite flange 60 of air inlet nipple 58, air will be assured entry into the interior of the aerator unit notwithstanding the presence of a substantial load of pulverulent material atop the unit and pressing down against flange 60.

Though only two such air inlet assemblies are illustrated in the drawings, it is to be understood that additional inlets may be provided if desired.

The aerator unit of the present invention is also provided with a central aperture 80 (see FIGURE 1) which is adapted to mate with an outlet in the central portion of the transport in which the aerator unit is mounted to permit discharge of pulverulent material from the transport tank.

In operation, the aerator unit of the present invention may be inserted in a deflated and limp condition into the interior of a tank such as that illustrated in the copending application of applicant heretofore mentioned. The unit may be secured to the tank walls by means of the clamping arrangement shown in FIGURE 3, thus assuring that no pulverulent material will gain access to the underside of the unit by tightly and rigidly sealing the edges of the pad to the inside walls of the tank. Since the pad will lie substantially flush with the bottom of the tank and since the tank is inclined toward its central discharge at an angle greater than the aerated angle of repose of the pulverulent materials to be transported (as described in said copending application), the aerator unit will be inclined similarly. The tank is then filled with pulverulent material through suitable inlets located in the top of the tank.

When it is desired to discharge the pulverulent material, a single live air supply is connected to nipple 58 and fluidizing air supplied to pockets 40 in the interior of the aerator unit. As aforesaid, channelizer pad 70 will assure that flange 60 will not be sealed off under the weight of the head of pulverulent material in the tank. The fluidizing air will pass from the pocket 40 to which it is introduced into the other pockets and beneath air pervious panels 46 and, eventually, into pockets 24 and 26 beneath air pervious central section 14.

As the aerator pad becomes inflated, fluidizing air will pass upwardly through air pervious section 14 to fluidize the pulverulent material in the tank. Since the tank bottom and aerated center section are inclined at an angle greater than the aerater angle of repose of the pulverulent material, the aerated material will flow by gravity to outlet aperture 80 and out through the discharge opening of the tank.

As described in said copending application of applicant, suitable piping may be provided for conducting the fluidizing air from the top portion of the tank to its discharge outlet so that pulverulent material discharging through aperture 80 will be picked up by this air and conveyed to a suitable station. The air can then be recycled to the single blower means previously described, passed in through inlet nipple 58 and then back into the tank to fluidize the pulverulent material. In this way, a single air blower delivering a suitable amount of air for conveying the pulverulent material may be employed not only to convey the material after its discharge but also as the source of fluidizing air.

As was the case with the embodiments described in applicant's copending application, it is not critical when using the aerator pad of the instant invention that the side walls of the tank be inclined at an angle greater than the unaerated angle of repose of the pulverulent material. As there described, this advantageous arrangement was made possible by connecting inlet nipple 58 to a live (pulsating) air supply (as distinguished from a static air supply), resulting in unexplainably complete emptying of the transport tank. As stated therein, this unusual and unexpected result permits the full use of all of the space within the tank with an important lowering of the center of gravity of the tank which, in the case of transport tanks, means safer operation through increased tank stability.

A significant feature of the present invention involves the provision of gas pervious panels 46 at the ends of the aerator unit. By virtue of this provision, pulverulent material which might otherwise bank up at the ends of the tank will be aerated and flow onto the longitudinal aerated central section 14, from which it will be discharged through outlet aperture 80. As will be apparent, such a provision makes it readily possible to provide a truly self-emptying tank unit for the handling of pulverulent materials.

In addition to the advantages set forth above, the aerator unit of the present invention possesses many advantages over comparable aerator units previously constructed. No doubt the most significant of these advantages resides in the provision of the transverse stitching 42. This stitching effectively prevents ballooning of gas impervious side panels 16 upon introduction of fluidizing air into pockets 40, yet eliminates the necessity for transverse webs such as those designated by the numeral 66 in FIGURE 4 of applicant's copending application abovementioned. This results not only in a cost savings from the manufacturing standpoint but also renders the aerator unit less bulky and significantly reduces its weight. In addition, transverse stitching 42 establishes channels directed toward the aerated central section 14, thus assuring that all pulverulent material on side panels 16 will be discharged from the tank. Such a structure is significantly superior to one in which stitching extends longitudinally along the aerator unit to form barriers across which at least a portion of the pulverulent material will not pass.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A demountable emptying unit for vessel comprising a normally limp, flexible hollow pad; said pad comprising a gas-impervious lower layer; an upper layer including an elongated gas pervious center strip and a pair of elongated side panels impervious to gas, all secured directly to said lower layer; said side panels having a plurality of longitudinally spaced channels extending transversely of the longitudinal axis of said center strip; said pad having gas inlet means for permitting the introduction of gas into the hollow of said pad.

2. A demountable emptying unit as defined in claim 1 wherein said channels define the boundaries of a plurality of longitudinally spaced pockets in said side panels extending transversely of the longitudinal axis of said center strip.

3. A demountable emptying unit as defined in claim 2 wherein said pockets are formed by securing said side panels to said lower layer at a plurality of longitudinally spaced points by means of transverse stitching.

4. A demountable emptying unit as defined in claim 3 wherein said center strip is secured to said side panels and to said lower layer by means of stitching extending along each of its longitudinal edges, at least a portion of said transverse and longitudinal stitching being discontinuous so as to establish communication between said pockets and the underside of said center strip.

5. A demountable emptying unit as defined in claim 4 wherein said center strip is secured to said side panels by means of substantially continuous stitching along its longitudinal edges, said center strip being secured to said lower panel by means of additional stitching extending discontinuously along its longitudinal edges, said discontinuous stitching permitting communication to be established between said pockets and the underside of said center strip.

6. A demountable emptying unit as defined in claim 5 wherein said transverse stitching terminates short of said discontinuously extending stitching to form a substantially continuous channel parallel to said last mentioned stitching and between each side panel and the lower layer.

7. A demountable emptying unit as defined in claim 6 wherein at least one end of said side panels is gas pervious.

8. A demountable emptying unit as defined in claim 1 wherein at least one end of said side panels is gas pervious.

9. A demountable emptying unit as defined in claim 8 wherein said gas pervious end of said side panels abuts the gas pervious center strip to form a T-shaped gas pervious surface at said end of the emptying unit.

10. A demountable emptying unit for vessels comprising a normally limp, flexible hollow pad; said pad comprising a gas-impervious lower layer; an upper layer including an elongated gas pervious center strip and a pair of elongated side panels impervious to gas all secured directly to said lower layer; at least one end of said side panels being gas pervious; said pad having gas inlet means for permitting the introduction of gas into the hollow of said pad.

11. A demountable emptying unit as defined in claim 10 wherein said gas pervious end of said side panels abuts the gas pervious center strip to form a T-shaped gas pervious surface at said end of the emptying unit.

12. A demountable emptying unit for vessels having at least one inflatable pocket comprising a gas impervious lower layer adapted to overlie the bottom of said vessel and a top layer secured directly to said lower layer and including a first portion impervious to gas and a second portion pervious to gas, a plurality of longitudinally spaced pockets being formed between said gas impervious portion and said lower layer, said pockets extending transversely of the longitudinal axis of said gas impervious portion and being formed by securing said gas impervious portion to said lower layer at a plurality of longitudinally spaced points; said inflatable pocket having gas inlet means for permitting the introduction of gas into said pocket between said gas impervious lower layer and said first gas impervious portion on the one hand and said gas impervious lower layer and said second gas pervious portion on the other hand.

13. A demountable emptying unit as defined in claim 12 wherein said gas impervious portion and lower layer are secured to one another by means of transverse stitching at a plurality of longitudinally spaced points.

14. A demountable emptying unit as defined in claim 13 wherein said gas impervious portion has a gas pervious section positioned adjacent at least one of its ends and directly overlying said gas impervious lower layer.

References Cited in the file of this patent

UNITED STATES PATENTS

| | | |
|---|---|---|
| 2,708,602 | Galle | May 17, 1955 |
| 2,792,262 | Hathorn | May 14, 1957 |
| 2,805,896 | Yellott | Sept. 10, 1957 |
| 2,919,955 | Paton | Jan. 5, 1960 |
| 2,931,523 | Nelligan | Apr. 5, 1960 |
| 2,943,891 | Paton | July 5, 1960 |
| 2,956,839 | Hermanns | Oct. 18, 1960 |